(No Model.)
J. G. MURPHY.
PROCESS OF AND APPARATUS FOR EXTRACTING GOLD FROM ITS ORES.
No. 559,593. Patented May 5, 1896.
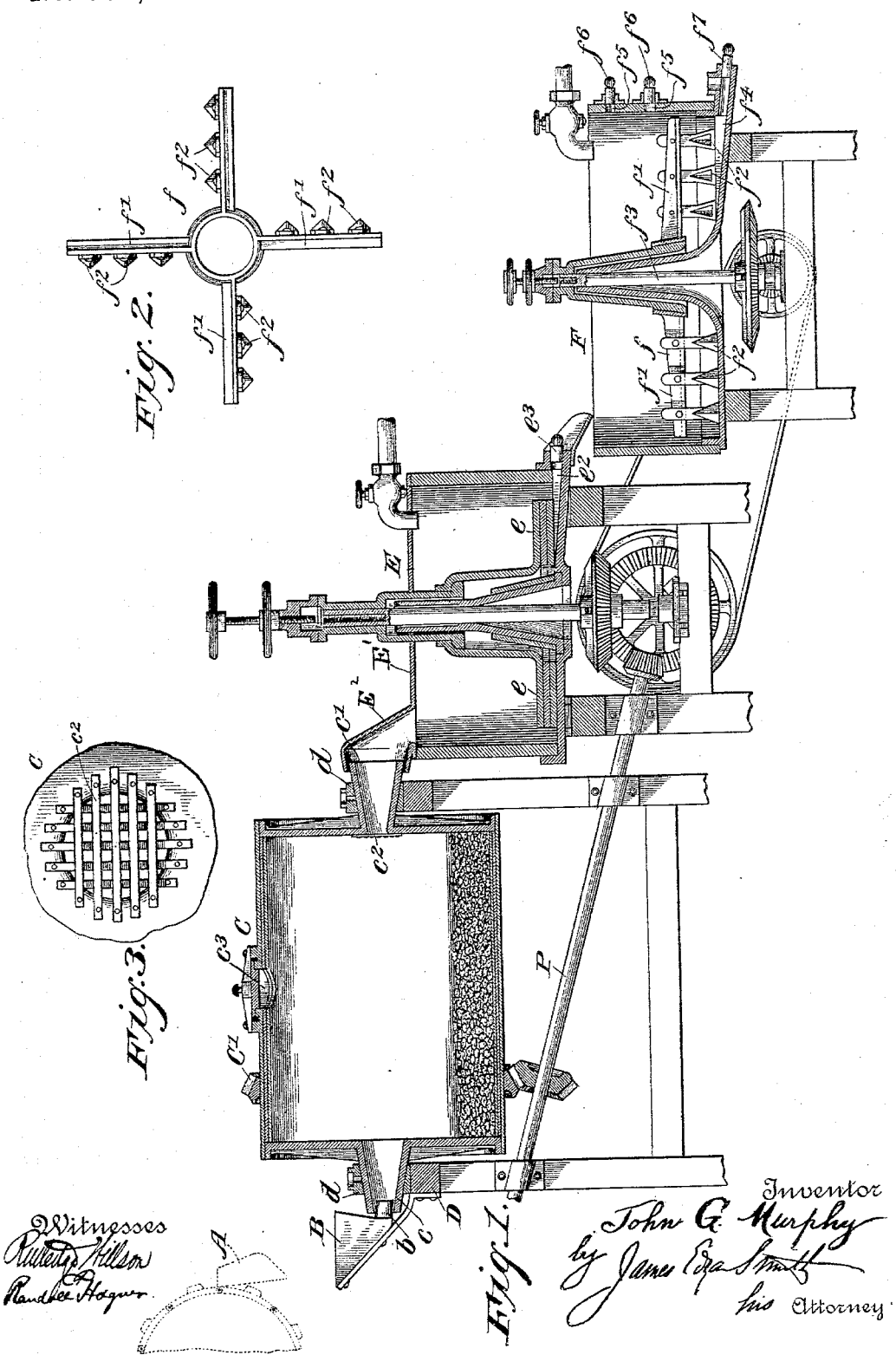

UNITED STATES PATENT OFFICE.

JOHN G. MURPHY, OF MIDDLETOWN, CONNECTICUT, ASSIGNOR, BY MESNE ASSIGNMENTS, TO MARY L. MURPHY, OF SAME PLACE.

PROCESS OF AND APPARATUS FOR EXTRACTING GOLD FROM ITS ORES.

SPECIFICATION forming part of Letters Patent No. 559,593, dated May 5, 1896.

Application filed July 10, 1895. Serial No. 555,544. (No model.)

*To all whom it may concern:*

Be it known that I, JOHN G. MURPHY, a citizen of the United States, residing at Middletown, in the county of Middlesex and State of Connecticut, have invented certain new and useful Improvements in a Process of and Apparatus for the Extraction of Gold from its Ores; and I do hereby declare the following to be a full, clear, and exact description of my invention, such as will enable others skilled in the art to which it appertains to make and use the same, reference being had to the accompanying drawings.

My invention is an improved process of and apparatus for the extraction of gold from its ores.

Gold is found in ores of two kinds, which are known as "free-milling" ores and "refractory" ores. What are called the "refractory" ores of gold are such as contain gold sparsely disseminated throughout their bulk, mechanically surrounded or enveloped by baser material, or so united with other elements as to form chemical combinations therewith. Such ores, among others, are those which contain galena, zinc-blende, iron pyrites, white iron, (arsenical,) and the ores of copper. The free-milling ores have a large percentage of their gold in a finely-divided, flake, molecular, or flour state, and much of this flour-gold is wasted or lost in the process of milling, either being carried away by the force of the water necessarily used in connection with the stamp-mill or remaining unreleased from the rock or gangue and being rejected along therewith. The stamp-mill, which can be used only with free-milling ores, is necessarily wasteful of a large percentage of flour-gold, and the smelting processes heretofore used in reducing refractory ores are expensive. In other words, ores do not in practice yield the quantities of gold which careful chemical analyses show them to contain, or if they do the cost of getting the gold exceeds its value. I have invented a method or process of recovering the gold from all such ores and an apparatus or arrangement of machinery whereby this process may be made effectual, and my method and apparatus are applicable as well to refractory as to free-milling ores. I have found by actual experiments and by practical exploitation of my invention that so far as results go it is immaterial whether the gold in ores such as I have mentioned is united to other elements chemically, mechanically, or otherwise, the point of my discovery being that the gold may be recovered completely from such ores, and the same thereby rendered of values nearly equal to the absolute amounts of gold they contain, at a comparatively small expense.

While it may not be absolutely true that gold is chemically united with baser elements in all of the refractory ores, it would seem to be true that in some of them at least there is a quasi-chemical union existing between the gold and some one or more of the other elements or combinations of elements. Whatever the real nature of the union may be, the fact is known to all practical mining engineers and chemists that from some ores fairly rich in gold it is impossible to get reasonable returns except at great expense for transportation and smelting, whereby their commercial values are destroyed. I have discovered that all of these ores may be profitably milled by reducing the entire body of gold-bearing ore uniformly and completely to an impalpable powder by gentle attrition and treating this powder for the separation of gold by amalgamation.

That extreme comminution or progressive subdivision of a compound substance, mechanically, will produce chemical change may or may not be true; but it is certain that such extreme comminution renders chemical change more readily possible than it would otherwise be, other things being equal. It is also certain that if the union between elements in any substance is merely a mechanical mixture, a conglomeration, or solution minute subdivision of such substance may be carried far enough to separate the elements themselves.

In all methods, processes, and machines heretofore devised for extracting gold from its free-milling ores there has been one defect which is wasteful of a large percentage of flake, flour, or molecular gold. This defect is written in plain characters upon the face of every apparatus and every process in use at the present day, and the practical novelty and utility of my invention appear as soon as the case is stated. Every practical milling method treats the separation and recovery of flake, flour, or molecular gold as subsidiary and as of secondary importance to the treatment of the ore for the separation and recovery of the grosser particles of gold, whereas the only method whereby flake or flour gold can be milled without loss is to make the recovery of gold in this state the main object of the extraction process, and this can only be done by reducing the whole of the gold-bearing ore to a uniform and impalpable powder, comminution being carried to the last possible degree without hardening or hammering the ore during the process. Smelting processes are expensive, but have heretofore been necessary for the reduction of refractory ores, as prior to my invention it was impossible to mill such ores satisfactorily.

My process consists, essentially, in reducing the entire body of gold-bearing ore, whether free-milling or refractory, as well the gold or gold compounds therein as the gangue and other materials associated therewith, to a state of such fine pulverization that there will be no distinction between one particle and another in regard to size—i. e., all the free gold will be in a flour, flake, or molecular condition and all the other materials will likewise be powdered, the reduction being accomplished without hammering, pounding, or compressive grinding. This reduction to practical uniformity in the minuteness of the particles of the whole mass will predispose to chemical change and will prepare the mass for new chemical combinations, so that uncombined gold will the more readily be taken up and amalgamate with mercury, and gold in combinations in the minute particles will the more easily leave these combinations to form a new one by amalgamation.

In practice I find that ore powders passing through screens having from one hundred to three hundred meshes to the linear inch are sufficiently fine; but finer states of division may be obtained, and may be necessary with some ores. All gold ores, with the exception of such as have their gold chemically united to a baser material, contain a percentage of flour or flake gold, varying from thirty per cent. to one hundred per cent. of the total amount of their gold. Many mines which show assay values of from eighteen dollars to thirty-four dollars per ton in native gold never produce any such values by practical working, for the simple reason that from forty per cent. to seventy per cent. of their native gold is in the flour, flake, or molecular condition, and is largely lost or wasted in the methods of extraction now used. Now the value of my process, its novelty, and utility appear in this: the saving of all or practically all of the gold in such ores, thereby rendering them of nearly their gross values, as indicated by chemical analyses, and, furthermore, in rendering possible the milling of refractory ores, such as are ordinarily smelted. The process by which I realize these conditions and effect this saving, and the apparatus by means of which I carry out this process, will now be described, describing the one with the other for the sake of brevity.

I have illustrated the apparatus in the accompanying drawings, in which like letters of reference indicate corresponding parts, and in which—

Figure 1 is a view of the essential portions or the apparatus as seen in vertical section, the figure being in the nature of a diagram. Fig. 2 is a view showing in detail one of the parts, and Fig. 3 is a view showing in detail the guards or gratings used to prevent the outflow of large pieces of ore from the cylinder.

In the drawings, the letter A indicates an elevator or conveyer arranged to feed broken or crushed ore from any suitable rock-breaker or ore-crusher (not shown) into a hopper B, whence it falls by gravity through the inclined chute $b$ into a pulverizing-cylinder C. The pulverizing-cylinder C may be made of any suitable material and may be mounted and operated in any convenient manner; but the arrangement shown in the drawings and about to be described is the one I prefer. As shown, this cylinder revolves on hollow trunnions which open into both of its closed ends, and these trunnions run in suitable boxes $d$ $d$, secured to a supporting-frame D. The cylinder may be strengthened and further supported by rollers arranged beneath it between the trunnions. The trunnion $c$ at the receiving end of the cylinder receives the neck of the chute $b$ within its inner periphery at its outer end, and the joint between the two is made as close as possible in order to prevent waste. The opening in this receiving-trunnion is the frustum of a hollow cone flaring toward the interior of the cylinder, this structure facilitating the delivery of the broken or crushed ore from the hopper into the cylinder and preventing stoppage or clogging of the ore within the trunnion.

The trunnion $c'$ at the discharge end of the cylinder is provided with suitable guards or gratings $c^2$ of iron or steel bars at its inner end to prevent the outflow of coarse pieces of ore, or the like, while the spaces between these bars will allow the comminuted materials to escape as soon as they rise above the middle of the cylinder. This trunnion $c'$ has its outer end flared to assist in the outward feed of the pulverized ore. The cylinder is provided with a manhole $c^3$, by means of which access may be had to the interior, and has at or near one of its ends the gear-wheel C' secured to it, the said wheel meshing with a gear-wheel upon a power-shaft P. In practice I find the best results are obtained from a porcelain-lined cylinder from eight to twelve feet in length, having a diameter of from six to eight feet, and I charge this cylinder with about three tons of loose Norway flint pebbles, or large pieces of ore, ranging in size from one to two inches in diameter. Setting the cylinder in rotation, crushed ore is fed into it by gravity from the hopper B, and as it passes from the receiving end of the cylinder to the discharge end the ore is ground between the porcelain lining and the pebbles and between the pebbles themselves, and the pieces of ore rubbing against each other are gently worn away by self-attrition, the whole operation resembling as closely as possible the natural destruction and wearing away of rock, whereby placer deposits are formed. It is to be noted that the friable materials used, as described, act by attrition upon the malleable constituents of the ore, wearing and tearing them gently and progressively. It will be seen that no ore will be discharged through the trunnion $c'$ until the total mass within the cylinder rises to the level of the said trunnion and is forced outward by the flow of crushed ore through the trunnion $c$ at the receiving end.

While it is true that the cylinder, if revolved at sufficient speed, would cause the crushed ore to pulverize itself without the use of flint pebbles or large pieces of ore, still experience proves that by using these pebbles time and power are economized. The ore is fed continuously into the hopper B, and thence is fed by gravity into the pulverizing-cylinder C, where the impact and grinding action of its own particles combined with that of the pebbles and of the walls of the rapidly-revolving cylinder reduce the ore to an impalpable powder, without compression of the particles, the fineness of which, before it passes through the discharge end of the cylinder at the trunnion $c'$, is determined by the number of revolutions made by the cylinder and the length thereof. I find by actual test that under the feed or flow of the ore from the hopper B, the said feed being occasioned by gravity alone, the course of the particles of ore through the cylinder is approximately a spiral beginning at the feed end of the cylinder and ending at the discharge end, and that by the time the ore has traveled this distance it is sufficiently pulverized for the purposes of my process. It will be obvious that by lengthening the cylinder, or by increasing the rate of revolution, or by prolonging the grinding, other things being equal, the fineness of the ore will be proportionately increased at the discharge end.

Comminution may be had in the cylinder, either in the presence of water or dry; but ordinarily the use of water is found to be of advantage. However, practice in each case must determine the particular requirements of each ore-body to be ground, whether it shall be ground wet or dry, and with some ores it may be desirable to use another lining than porcelain for the cylinder.

The comminuted ore may be tested to determine its fineness by taking a sample of the discharge and passing it through a screen made of silk fiber. Platinum screens may also be used as fine as two hundred wires to the linear inch, but for the finer states of comminution silk-gauze is the only means of testing. This comminuted ore is discharged into an amalgamating-pan E, which, as will be seen, is of a simple and ordinary construction, but is provided with a cover $E'$, having an opening for a faucet or the like, and a chute $E^2$, arranged at one side, which extends above the pan and embraces the outer periphery of the outer flaring end of the trunnion $c'$. This arrangement of cover and chute with the flaring trunnion of the pulverizing-cylinder prevents waste of the powdered product as it falls into the pan, insures the delivery of such product within the pan, and retains it therein.

In using the amalgamating-pan I avoid a flow of water and merely admit enough water to the pan to moisten the pulverized ore and form a thin paste with it. By avoiding the use of flowing water one cause of waste is eliminated, as it can easily be seen that any flow of water would carry off some of the gold in its finely-divided state.

The pan E is provided with mullers $e$, which may be of any usual or suitable construction and material and are driven in the usual way by a shaft geared with the power-shaft. There is an inclined well $e^2$ in the bottom of the pan, which is provided with a plug or tap $e^3$, and the entire contents of the pan may be discharged therefrom from time to time by removing the tap or plug $e^3$ and washing the charge into the settler F.

From the time the ore leaves the hopper B until the ore, mercury, amalgam, and water are washed into the settler F the fine dust produced is prevented from floating in the air and from being lost thereby or by reason of drafts, gusts of wind, or the like.

The settler F has a stirrer $f$, which consists of radial arms $f'$, provided with shoes or plows $f^2$, and the whole is driven in any suitable manner, such as by the central shaft $f^3$, which is geared to the power-shaft P.

The amalgamation of the pulverized ore is accomplished by allowing a limited amount of water to flow into the pan E, just enough water to form a thin paste with the quantity of ore to be treated—say from one ton to a ton and a half—and then adding sufficient mercury to amalgamate the gold—say a tank of seventy-five pounds. The discharge from the cylinder may continue or may be stopped for the time being, but if the discharge is continuous there must be a continuous supply of mercury. The muller is set in rotation at about sixty revolutions per minute, and this rate is continued until the amalgamation of the gold in the ore is completed. By panning a sample the progress of amalgamation can be easily determined. As soon as the amalgamation is completed the speed of the muller is reduced, the plug or tap $e^3$ is removed from the orifice of the inclined well $e^2$ at the bottom of the pan, and water is turned on to wash the whole mass of pulp and amalgam into the settler F. The water which washes the charge from the amalgamating-pan serves also to dilute the pulp and make it sufficiently fluid to enable the mercury and amalgam more readily to settle into the well of the settler, which is shown in the drawings as $f^4$. In this settler the amalgam and mercury are finally cleaned and separated from impurities, which are drawn off through the holes $f^5$ in the periphery of the settler, these holes being provided, of course, with plugs $f^6$. After sufficient cleansing by means of the revolution of the stirrer-arms and the settling of the mercury and amalgam into the well $f^4$, the mercury and amalgam are finally withdrawn through the said well or rather through its orifice, which is provided with a plug or similar device $f^7$.

The mercury and amalgam withdrawn from the settler are treated in the ordinary way for the recovery of the gold and the saving of the quicksilver.

It is to be understood that several amalgamating-pans and several settlers or washers may be used in connection with the pulverizer, either in series or otherwise, as may be most convenient and effective; but I find that ordinarily with the minute and unhardened pulverization of the ore which I effect two pans and one settler are ample in the treatment of the product, as amalgamation with pulverized and unhardened ores is rapid.

My process has been used in the treatment of telluride ores and resulted in extracting therefrom between twenty-five per cent. and thirty-three per cent. of the entire amount of gold therein.

My process contemplates a practically-continuous operation, the ore being fed forward from the hopper through the pulverizing-cylinder into the amalgamating-pan, where it is treated with mercury, and from the amalgamating-pan the whole mass is washed into the settler, where the amalgam and mercury are cleaned and separated from the rest of the mass, and each and every step in this feeding forward is accomplished by gravity alone. While this is apparent enough in the other portions of the process, from the construction of the apparatus it might seem to need some explanation as applied to the comminuting-cylinder; but when it is considered that there is a continuous pressure at the receiving end of the cylinder, caused by the inflow of the crushed ore, and that this ore from the time it is received within the cylinder is ground and pulverized in a progressive way until the particles are separated one from another to almost the last degree, it will be seen that the pulverized dust or flour thereby produced, being in continual agitation caused by the revolution of the cylinder and the motion of the pebbles therein, will be approximately analogous to a fluid and subject to the law of equal pressure in all directions at the same level. This holds true whether the ore be ground wet or dry. Now the inflow being at one end, and the only possible outflow at the opposite end, and the inflow arising from gravity alone, it follows that the outflow necessarily arises from gravity.

It is of importance to note that pounded or hammered gold will resist the action of mercury for a long time, and that the so-called "rusty" gold is merely gold enveloped in a coating of some substance—a gas, a film of grease, a deposit of iron rust, or the like— and thereby protected from the action of mercury. Now, before gold that has been hammered will amalgamate readily with mercury it must be annealed; and before rusty gold can be amalgamated the coating surrounding the gold must be pierced or removed. Further, the resistance of hammered gold to amalgamation with mercury is irrespective of mass, or, in other words, equal surfaces of gold hammered to equal degrees resist amalgamation equally, and the size and shape of the hammered particles are relatively unimportant, their total surface areas being the real things for comparison. Likewise, gold which is rusty, whether in a large mass or in a small particle, is protected from mercury as long as its envelop remains entire. Stamp-mills, ore-crushers, and the like have a hammering or consolidating effect upon gold subjected to their action, and while much of their flour or powdered gold is probably lost through waste from the great force of water used in connection with them, another large percentage of the total waste is undoubtedly due to the fact that such gold as is not lost in the first instance is lost in the later processes by reason of its hammered condition, and its consequent slowness to amalgamate with mercury. Now, the difference between the product obtained by my process and the products resulting from the processes formerly in use consists not only in the greater fineness in the reduction practiced by me, but principally in the fact that this comminuted product is unhammered, uncondensed, unhardened; and also in the fact that the rusty gold is not only deprived of its coating, but that this is done without compressive grinding, and in such a way as to leave the gold in its natural and soft condition.

The pulverization effected by my process is not only an extreme comminution of the total mass of the ore-body, but it is such a comminution obtained without the tremendous pounding or compressive grinding actions used in other processes. While it is true that the crushed ore delivered into the pulverizing-cylinder will have been subjected to some little grinding, pounding, or compressing in the rock-breaker or ore-crusher necessarily used for breaking it, it will be seen that this compression will be effective upon a very small portion of the mass, and that within the cylinder the pulverization is accomplished more by attrition, wearing, gentle grinding, and the like than it is by a pounding action, a compressive action, or a hammering process. In other words, comminution is effected without condensation, hammering, or compression of the gold, and the powdered product is delivered into the amalgamating-pan not only in the finest possible condition—*i. e.*, in the condition presenting the greatest surface area for a given quantity of gold—but the surfaces of the particles making up this greatest area are worn and scratched in such manner as to present the metal most effectively to the action of the mercury, and the gold itself is in its natural and soft condition. It may be noted in this connection that some degree of heat is produced in the pulverizing-cylinder, though this rarely rises above 150° Fahrenheit, and while this would not be sufficient under ordinary circumstances to cure hammered gold it may have some effect in preparing the infinitesimal particles produced by my process for amalgamation, especially by driving out of the pores of the gold gases, greases, and the like.

Having thus fully described my invention, what I claim as new, and desire to secure by Letters Patent, is—

1. In an apparatus for separating gold from its ores, the combination with a pulverizing-cylinder, revolving on hollow trunnions both flared in the same direction, of a hopper having an inclined chute fitting within the inner periphery of the outer end of one trunnion, and a covered amalgamating-pan having an inclined chute embracing the outer periphery of the outer flaring end of the other trunnion, substantially as and for the purpose set forth.

2. The process of separating gold from its ores, which consists essentially in reducing, without compressive grinding, hammering, pounding, or the like, the entire mass of ore equally to an impalpable powder by gentle attrition of the mass in a gradually-fed revolving cylinder, whence only the thoroughly-pulverized materials are permitted to escape by overflow as an impalpable powder; delivering said powder to mercury in an amalgamating-pan to which water is admitted only in quantity sufficient to form a paste, and not enough to produce a flow of the pulp; and, finally, when the amalgamating action upon the ore has been completed, washing the pulp into a settler where the amalgam settles from the diluted mass while the impurities are drawn off.

3. The process of separating gold from its ores, which consists essentially in reducing the ores to an impalpable powder by gentle attrition in a revolving cylinder from which only the thoroughly-pulverized materials are permitted to escape by overflow into an amalgamating-pan, amalgamating the pulverized materials within the said pan with a quantity of water neither increased nor diminished during the process of amalgamation; and, finally, when the amalgamating action upon the ore has been completed, washing and diluting the pulp into a settler where the amalgam and impurities are separated.

In testimony whereof I affix my signature in presence of two witnesses.

JOHN G. MURPHY.

Witnesses:
J. ALTHEUS JOHNSON,
NORMAN H. O'DONNOGHUE.